United States Patent
Eser et al.

(10) Patent No.: US 9,255,536 B2
(45) Date of Patent: Feb. 9, 2016

(54) METHOD AND DEVICE FOR OPERATING AN INTERNAL COMBUSTION ENGINE

(71) Applicants: Gerhard Eser, Hemau (DE); Wolfgang Moser, Regensburg (DE); Sebastian Viehöver, Regensburg (DE)

(72) Inventors: Gerhard Eser, Hemau (DE); Wolfgang Moser, Regensburg (DE); Sebastian Viehöver, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 45 days.

(21) Appl. No.: 14/348,729

(22) PCT Filed: Sep. 27, 2012

(86) PCT No.: PCT/EP2012/069031
§ 371 (c)(1),
(2) Date: Mar. 31, 2014

(87) PCT Pub. No.: WO2013/045526
PCT Pub. Date: Apr. 4, 2013

(65) Prior Publication Data
US 2014/0326227 A1     Nov. 6, 2014

(30) Foreign Application Priority Data
Sep. 29, 2011   (DE) .......................... 10 2011 083 781

(51) Int. Cl.
| | | |
|---|---|---|
| *F02D 41/00* | (2006.01) | |
| *F02D 41/14* | (2006.01) | |
| *G01M 15/10* | (2006.01) | |

(52) U.S. Cl.
CPC ........ *F02D 41/1443* (2013.01); *F02D 41/0085* (2013.01); *F02D 41/1444* (2013.01);
(Continued)

(58) Field of Classification Search
CPC ............ F02D 41/1454; F02D 41/0085; F02D 41/1456; F02D 2041/1422; F02D 2041/1409; F02D 41/1482; F02D 41/1486; F01N 2560/025; G01M 15/104
USPC .............. 123/672, 406.14, 696, 673; 701/103
See application file for complete search history.

(56) References Cited

U.S. PATENT DOCUMENTS

| | | | |
|---|---|---|---|
| 6,325,056 B1 | 12/2001 | Weining et al. | ................ 123/673 |
| 6,575,152 B2 * | 6/2003 | Poggio | ................ F02D 41/1475 |
| | | | 123/681 |

(Continued)

FOREIGN PATENT DOCUMENTS

| | | | | |
|---|---|---|---|---|
| CN | 101713344 A | 5/2010 | ............. | F02D 41/22 |
| DE | 19903721 C1 | 7/2000 | ............. | F02D 41/00 |

(Continued)

OTHER PUBLICATIONS

International Search Report and Written Opinion, Application No. PCT/EP2012/069031, 12 pages, Jan. 16, 2013.

(Continued)

*Primary Examiner* — Marguerite McMahon
*Assistant Examiner* — James Kim
(74) *Attorney, Agent, or Firm* — Slayden Grubert Beard PLLC

(57) ABSTRACT

An internal combustion engine has a plurality of cylinders with fuel-metering injection valves, and an exhaust gas probe that generates a measurement signal characteristic of the air/fuel ratio in the respective cylinder. A correction signal for fuel mass to be metered is determined using a lambda controller as a function of the exhaust gas probe measurement signal. When at least one predefined condition is met within a predefined operating range of the engine, a cylinder-specific diagnosis relating to the emissions of pollutants is performed on the basis of unsmooth running, wherein the cylinder-specific diagnosis is actively performed only in a respective detection phase that is applied to a neutral value by a modified proportional discrete level of the correction signal and is performed with a modified integral parameter of the lambda controller that is reduced as compared with an integral parameter in a normal operating mode of the lambda controller.

6 Claims, 3 Drawing Sheets

(52) U.S. Cl.
CPC ........ *F02D41/1454* (2013.01); *F02D 41/1473* (2013.01); *F02D 41/1486* (2013.01); *F02D 41/1498* (2013.01); *F02D 2041/1409* (2013.01); *F02D 2041/1422* (2013.01); *G01M 15/104* (2013.01)

(56) References Cited

U.S. PATENT DOCUMENTS

| | | | |
|---|---|---|---|
| 7,331,214 B2 | 2/2008 | Aliakbarzadeh et al. | 73/23.32 |
| 7,703,437 B2 | 4/2010 | Scheffler et al. | 123/406.14 |
| 7,874,285 B2 * | 1/2011 | Barnikow | F02D 41/222 123/688 |
| 8,196,460 B2 * | 6/2012 | Barnikow | F02D 41/1495 73/114.69 |
| 8,577,645 B2 | 11/2013 | Turin et al. | 702/183 |
| 2003/0209235 A1 | 11/2003 | Javaherian | 123/674 |
| 2008/0307852 A1 * | 12/2008 | Rodatz | F02D 41/1454 73/1.06 |
| 2011/0314892 A1 * | 12/2011 | Wehmeier | F02D 41/1441 73/1.06 |
| 2012/0006107 A1 * | 1/2012 | Azadeh | F02D 41/008 73/114.31 |
| 2013/0092135 A1 * | 4/2013 | Porten | F02D 13/0265 123/568.11 |

FOREIGN PATENT DOCUMENTS

| | | | |
|---|---|---|---|
| DE | 102004004291 B3 | 1/2005 | F02D 35/00 |
| DE | 102006026390 A1 | 12/2007 | F02D 41/14 |
| WO | 2013/045526 A1 | 4/2013 | F02D 41/00 |

OTHER PUBLICATIONS

Chinese Office Action, Application No. 201280047703.9, 11 pages, Sep. 6, 2015.

* cited by examiner

AS

RB   EPH                              KS

MFF_SP

US 9,255,536 B2

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2012/069031 filed Sep. 27, 2012, which designates the United States of America, and claims priority to DE Application No. 10 2011 083 781.7 filed Sep. 29, 2011, the contents of which are hereby incorporated by reference in their entirety.

TECHNICAL FIELD

The invention relates to a method and a device for operating an internal combustion engine having a plurality of cylinders, which are each assigned injection valves for metering fuel, and an exhaust gas probe which has discrete level probe characteristics and is arranged in an exhaust gas section and whose measurement signal is characteristic of the air/fuel ratio in the respective cylinder.

BACKGROUND

Within the scope of strict legal requirements relating to the emissions of pollutants by motor vehicles, an important measure is to keep a low level of emissions of pollutants which occur during the combustion of the air/fuel mixture in the respective cylinder of the internal combustion engine. A further measure is also to use exhaust gas post-treatment systems in internal combustion engines, said systems converting into harmless substances the emissions of pollutants which are generated in the respective cylinder during the combustion process of the air/fuel mixture. For this purpose, exhaust gas catalytic converters are used which convert carbon monoxide, hydrocarbons and nitrogen oxides into harmless substances.

Both the aimed-for influencing of the generating of the emissions of pollutants during the combustion and the conversion of the components of the pollutants with a high degree of efficiency by the exhaust gas catalytic converter require a very precisely set air/fuel ratio in the respective cylinder. In particular in view of the fact that the exhaust gas catalytic converters are increasingly arranged very close to the engine and also in order to comply with corresponding specific legal requirements in individual countries, precise cylinder-specific setting of the air/fuel ratio is increasingly important, since the individual exhaust gas packets only mix relatively poorly because of the short mixing distance.

Increasingly stringent legal requirements with regard to the emission of limited pollutants make it necessary to allow a small tolerance in the air/fuel ratio between the individual cylinders. A large uneven distribution and an absence of compensation cause the emissions to become significantly worse or even give rise to perceptible problems with respect to driving capabilities.

Furthermore, there are legal requirements for the cylinder-selective unequal distribution in the air/fuel ratio to be detected incrementally in an increasing portion of the respective vehicles in relation to the vehicle fleets of the respective manufacturers, said uneven distribution causing predefined emission limiting values to be exceeded.

DE 10 2004 004 291 B3 discloses using cylinder-specific lambda control, by means of which the individual deviations of the respective cylinder-specific air/fuel ratios from an average air/fuel ratio are to be minimized. A measurement signal of an exhaust gas probe which is arranged in an exhaust gas section, and which is characteristic of the air/fuel ratio in the respective cylinder, is detected at a predefined crankshaft angle with respect to a reference position of the piston of the respective cylinder and is assigned to the respective cylinder. By means of the cylinder-specific lambda controller, a manipulated variable for influencing the air/fuel ratio in the respective cylinder as a function of the measurement signal generated for the respective cylinder is generated. The predefined crankshaft angle is adapted as a function of an instability criterion of the controller.

DE 10 2006 0263 90 A1 discloses an electronic control device for the control of the internal combustion engine in a motor vehicle having an unsmooth running determining unit and having an injection quantity correction unit, wherein a defined group of cylinders is assigned one lambda probe. The injection quantity correction unit is configured such that the injection quantity of one cylinder, which is to be tested, of the defined group can be adjusted in the lean direction by a difference adjustment value which is assigned to an unsmooth running difference value, and the injection quantity of at least one of the other cylinders which is assigned to the same lambda probe is correspondingly adjusted in the rich direction, with the result that overall a predefined lambda value of this group, preferably a lambda value of at least approximately 1, is attained. The injection quantity correction value is also configured in such a way that in this way a cylinder-specific difference adjustment value can be set for each cylinder of the defined group, and that cylinder-specific correction values can be determined by setting the cylinder-specific difference adjustment values in a ratio with respect to one another.

SUMMARY

One embodiment provides a method for operating an internal combustion engine having a plurality of cylinders, which are each assigned respective injection valves for metering fuel, and an exhaust gas probe which has discrete level probe characteristics and is arranged in an exhaust gas section and whose measurement signal is characteristic of an air/fuel ratio in the respective cylinder, a crankshaft angle sensor whose measurement signal is representative of a crankshaft angle of a crankshaft, the method comprising determining a correction signal for a fuel mass to be metered using a lambda controller, e.g., as a function of the measurement signal of the exhaust gas probe, when at least one predefined condition is satisfied within a predefined operating range of the internal combustion engine, performing a cylinder-specific diagnosis with respect to emissions of pollutants on the basis of unsmooth running, wherein during the execution of the cylinder-specific diagnosis, the diagnosis actively performed only in a respective detection phase initiated by a modified proportional jump of the correction signal to a neutral value, and wherein the diagnosis is performed with a modified integral parameter of the lambda controller, which integral parameter is reduced in absolute value compared to an integral parameter in a normal operating mode of the lambda controller.

In a further embodiment, the lambda controller is operated in the normal operating mode between two successive detection phases for at least one controller cycle.

In a further embodiment, the predefined operating range is a lower partial load operating mode.

In a further embodiment, the method further comprises during a respective detection phase, incrementally making the air/fuel mixture to be fed to one of the cylinders leaner using a lean adjustment signal until a predefined unsmooth running value is attained with respect to the cylinder, and determining a diagnostic value relating to the respective cylinder as a function of the lean adjustment signal.

In a further embodiment, the respective detection phase is ended chronologically correlated with the attainment of the predefined unsmooth running value and the normal operating mode of the lambda controller is continued.

Another embodiment provides a device for operating an internal combustion engine having a plurality of cylinders, which are each assigned respective injection valves for metering fuel, and an exhaust gas probe which has discrete level probe characteristics and is arranged in an exhaust gas section and which generates a measurement signal characteristic of an air/fuel ratio in the respective cylinder, and a crankshaft angle sensor that generates a measurement signal representative of a crankshaft angle of a crankshaft, wherein the device is configured to determine a correction signal for a fuel mass to be metered using a lambda controller, as a function of the measurement signal of the exhaust gas probe, when at least one predefined condition is satisfied within a predefined operating range of the internal combustion engine, perform a cylinder-specific diagnosis with respect to emissions of pollutants on the basis of unsmooth running, wherein during the execution of the cylinder-specific diagnosis, the diagnosis actively performed only in a respective detection phase initiated by a modified proportional jump of the correction signal to a neutral value, and wherein the diagnosis is performed with a modified integral parameter of the lambda controller, which integral parameter is reduced in absolute value compared to an integral parameter in a normal operating mode of the lambda controller.

BRIEF DESCRIPTION OF THE DRAWINGS

Example embodiments are explained in more detail below with reference to the drawings, in which.

DETAILED DESCRIPTION

Figure 1:
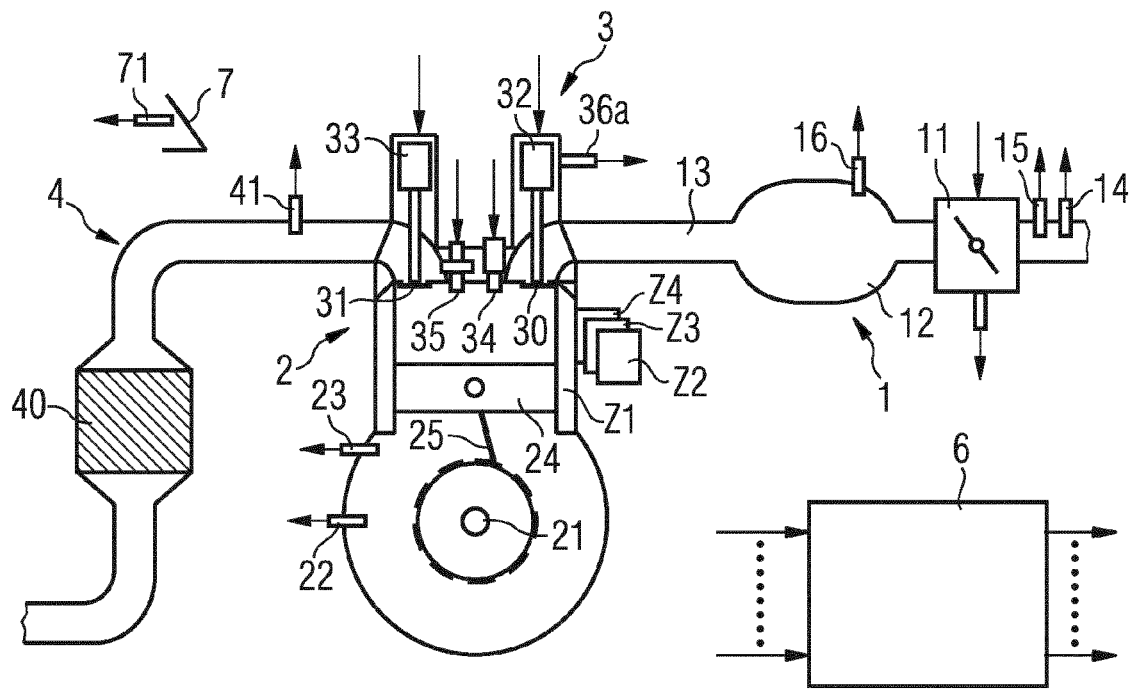
FIG. 1 shows an internal combustion engine with a control device.

Embodiments of the present invention provide a method and a device for operating an internal combustion engine which permit particularly reliable operation of the internal combustion engine.

Some embodiments provide a method and a corresponding device for operating an internal combustion engine having a plurality of cylinders, which are each assigned respective injection valves for metering fuel, and an exhaust gas probe which has discrete level probe characteristics and is arranged in an exhaust gas section and whose measurement signal is characteristic of the air/fuel ratio in the respective cylinder. In addition, the internal combustion engine has a crankshaft angle sensor whose measurement signal is representative of a crankshaft angle of a crankshaft. A correction signal for a fuel mass to be metered is determined by means of a lambda controller, specifically as a function of the measurement signal of the exhaust gas probe. In this way, the fuel mass to be metered can be correspondingly adapted by means of the correction signal.

Within a predefined operating range of the internal combustion engine, a cylinder-specific diagnosis, which is based on unsmooth running, with respect to emissions of pollutants is carried out when at least one predefined condition is satisfied.

The predefined condition can be satisfied, for example, in the case of a predefined quasi-steady-state operating state and/or after the expiry of a predefined time period or else distance travelled.

During the execution of the cylinder-specific diagnosis, the diagnosis is carried out actively only in a respective detection phase which is initiated by a modified proportional jump of the correction signal to a neutral value and is carried out with a modified integral parameter of the lambda controller, which integral parameter is reduced in absolute value compared to an integral parameter in a normal operating mode of the lambda controller.

In the case of the exhaust gas probe with discrete level characteristics in the regular operating mode of the lambda controller, the correction signal of the lambda controller firstly has a linearly rising profile, caused by the integral parameter in the normal operating mode. This is followed by a plateau phase which is terminated with a jump in the correction signal which is referred to as a proportional jump. The jump is followed by a linear reduction in the correction signal until a plateau phase follows again, which is in turn followed by an opposite proportional jump of the correction signal. This process is repeated.

The proportional jump is caused by a proportional component with a proportional parameter of the lambda controller. The respective plateau phase is started in each case chronologically correlated with detection of a stoichiometric air/fuel ratio by the exhaust gas probe with discrete level characteristics.

The time period of the plateau phase subsequent to the linearly rising profile of the correction signal and the time period of the plateau phase subsequent to the linearly decreasing profile of the correction signal can differ. One or both of these time periods can in principle also be reduced to a value of approximately zero, in particular zero.

The correction signal of the lambda controller influences a fuel mass which is to be metered, and therefore influences the actuation of the respective injection valve.

As a result of the active execution of the diagnosis only in the respective detection phase, it is easily possible to make a contribution such that, caused by the correction signal during the detection phase, only a very small change in injection occurs in relation to the respective cylinder, and therefore possible disruption which is caused as a result with respect to the diagnosis which is based on unsmooth running is very small or even negligible. As a result, the quality of the diagnosis can be influenced very positively.

In particular, in the normal operating mode of the lambda controller which follows the respective detection phase, the integral parameter for the normal operating mode is activated and therefore the correction signal then has a linear profile which follows the detection phase and has a larger gradient in absolute value than during the detection phase. The lambda controller is operated in its normal operating mode in particular before and after the detection phase.

The execution of the diagnosis which is based on unsmooth running makes it possible, in the case of an exhaust gas probe with discrete level characteristics, for cylinder-specific deviations of the air/fuel mixture which is actually in the respective cylinder before the combustion to be determined with respect to the other cylinders before the combustion.

According to one embodiment, the lambda controller is operated in the normal operating mode between two successive detection phases for at least one controller cycle. In this way, in particular it is possible to make a contribution to permitting an exhaust gas catalytic converter connected downstream to be operated within its so-called conversion window within which oxygen can be stored or else removed. In this way, it is possible to make a contribution to emissions which are as low as possible, even during the cylinder-specific diagnosis.

According to one embodiment, the predefined operating range is a lower partial load operating mode. The lower partial load operating mode can be present, for example, below or approximately equal to a rotational speed of 2500 revolutions per minute.

The partial load operating mode is particularly well suited for carrying out the diagnosis since here the diagnosis can be carried out with high quality.

According to a further embodiment, during a respective detection phase the air/fuel mixture which is to be fed to one of the cylinders is incrementally made leaner by means of a lean adjustment signal until a predefined unsmooth running value is attained with respect to this cylinder. A diagnostic value relating to the respective cylinder is determined as a function of the lean adjustment signal. In this way, the diagnostic valve can be determined in a particularly simple manner.

In this context it may be particularly advantageous if the respective detection phase is ended chronologically correlated with the attainment of the predefined unsmooth running value and the normal operating mode of the lambda controller is continued. In this way, the detection phase can easily be controlled as briefly as necessary.

An internal combustion engine (FIG. 1) comprises an intake section 1, an engine block 2, a cylinder head 3 and an exhaust gas section 4. The intake section 4 preferably comprises a throttle valve 11, and also a collector 12 and intake manifold 13 which leads to a cylinder Z1 and into the engine block 2 via an inlet duct. The engine block 2 also comprises a crankshaft 21 which is coupled to a piston 24 of the cylinder Z1 via a connecting rod 25.

The cylinder head 3 comprises a valve drive with a gas inlet valve 30, a gas outlet valve 31 and valve drives 32, 33. The cylinder head 3 also comprises an injection valve 34 and a sparkplug 35. Alternatively, the injection valve 34 can also be arranged in the intake section 1.

The exhaust gas section 4 comprises an exhaust gas catalytic converter 40 which is preferably embodied as a three-way catalytic converter.

A control device 6 is provided which is assigned sensors which detect various measurement variables and which determine the measurement values of the measurement variable. Operating variables comprise, as well as the measurement variables, also variables derived therefrom. The control device 6 controls, as a function of at least one of the operating variables, the actuating elements which are assigned to the internal combustion engine and to which in each case corresponding actuating drives are assigned, by generating actuating signals for the actuating drives.

The control device 6 can also be referred to as a device for operating the internal combustion engine.

The sensors are a pedal position signal generator 71 which detects the position of an accelerator pedal 7, an air mass flow rate meter 14 which detects an air mass flow rate upstream of the throttle valve 11, a temperature sensor 15 which detects an intake air temperature, a pressure sensor 16 which detects the intake manifold pressure, a crankshaft angle sensor 22 which detects a crankshaft angle, which is then assigned a rotational speed, a torque sensor 23 which detects a torque of the crankshaft 21, a camshaft angle sensor 36a which detects a camshaft angle, and an exhaust gas probe 41 which detects a residual oxygen content of the exhaust gas and whose measurement signal is characteristic of the air/fuel ratio in the cylinder Z1 during the combustion of the air/fuel mixture. The exhaust gas probe 41 is embodied as a binary lambda probe and therefore has a measurement signal with discrete level characteristics. The jump in the measurement signal takes place in a narrow range about the stoichiometric air/fuel ratio.

Depending on the configuration, any subset of the specified sensors may be present or additional sensors may also be present.

The actuating elements are, for example, the throttle valve 11, the gas inlet and gas outlet valves 30, 31, the injection valve 34 or the sparkplug 35.

In addition to the cylinder Z1, further cylinders Z2 to Z4, which are also assigned corresponding actuating elements, are also provided. Each exhaust gas bank of cylinders, which can also be referred to as a cylinder bank, is preferably respectively assigned an exhaust gas train of the exhaust gas section 4, and the respective exhaust gas section is respectively assigned an exhaust gas probe 41 correspondingly.

The control device 6 preferably comprises a computing unit and a memory for storing data and programs. In order to operate the internal combustion engine, one or more programs for operating the internal combustion engine are stored in the control device 6, it being possible to run said programs in the computing unit during operation.

Figure 2:
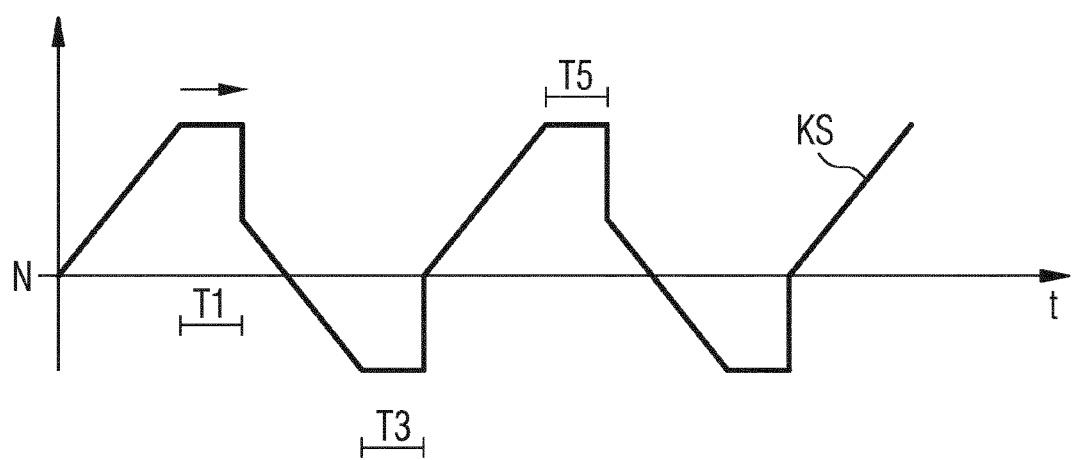
FIG. 2 shows a signal profile of a correction signal of the lambda controller during the normal operating mode of the lambda controller.

In this context, the control device has a lambda controller whose actuating signal is a correction signal KS whose profile assumes, for example, the profile illustrated in FIG. 2 in the normal operating mode of the lambda controller. In this context, in particular a plateau phase is provided which chronologically follows a stoichiometric air/fuel ratio being attained, which is detected on the basis of the measurement signal of the discrete level probe. The plateau phase is assumed, for example, for a time period T1.

In this context, the time period of the plateau phase can depend, for example, on a measurement signal of a further exhaust gas probe which can be arranged downstream of the exhaust gas catalytic converter 40 and which is also referred to as a trimming probe. Subsequent to the time period T1, there is a so-called proportional jump of the measurement signal as a function of a proportional parameter of the lambda controller, wherein then an integral parameter of the lambda controller is subsequently activated, and therefore a linear reduction in the correction signal takes place up to a time at which a renewed detection of the stoichiometric air/fuel ratio takes place. Subsequent to this, there is a new plateau phase with a predefined time period T3 before a jumpback takes place, which is also referred to as a proportional jump. Subsequent to this, the integral parameter is activated again and there is an increase in the correction signal until the passage through the stoichiometric air/fuel ratio is detected again.

Figure 3A:
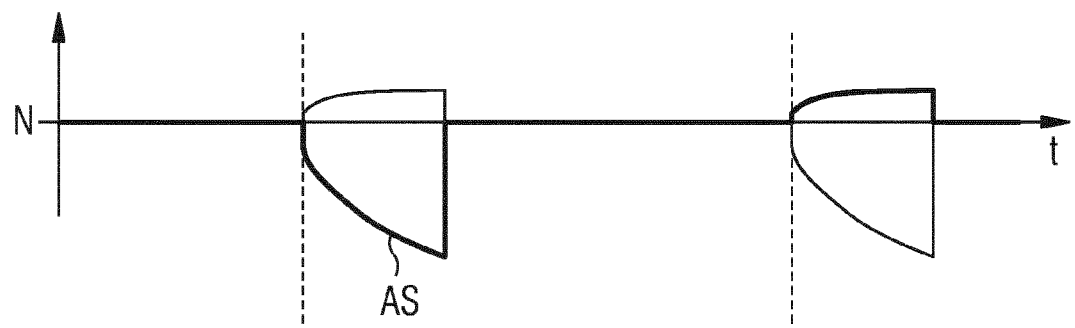
FIGS. 3A to 3C show various measurement signals.
Figure 3B:
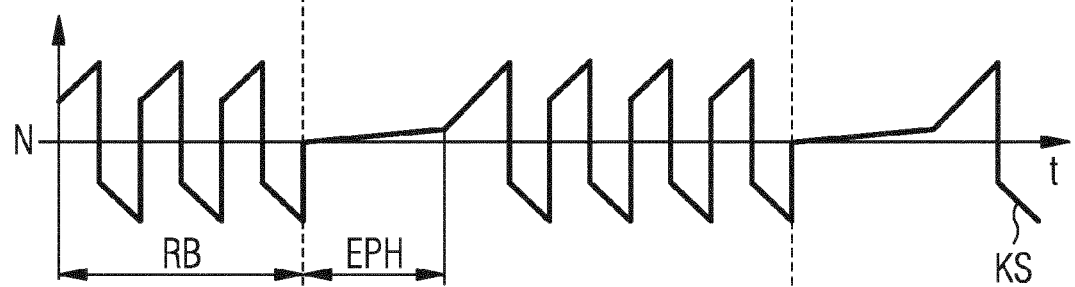

In this context, the profile of the correction signal can also assume the profile illustrated in the FIG. 3B in the normal operating mode RB. With respect to the normal operating mode, the lambda controller is embodied in a conventional way which is known to the relevant person skilled in the art.

In the case of the profile of the control signal which is illustrated in FIG. 3B, in principle it is also possible, for example, for plateau phases to be present as illustrated in FIG. 2.

For example, the correction signal KS can be embodied in the form of a factor which is used to influence a fuel mass which is to be metered and is determined in some other way. This can be done, for example, by means of corresponding multiplication.

A neutral value N of the correction signal KS is in the case of an embodiment as a factor a value of 1, for example.

Figure 4:
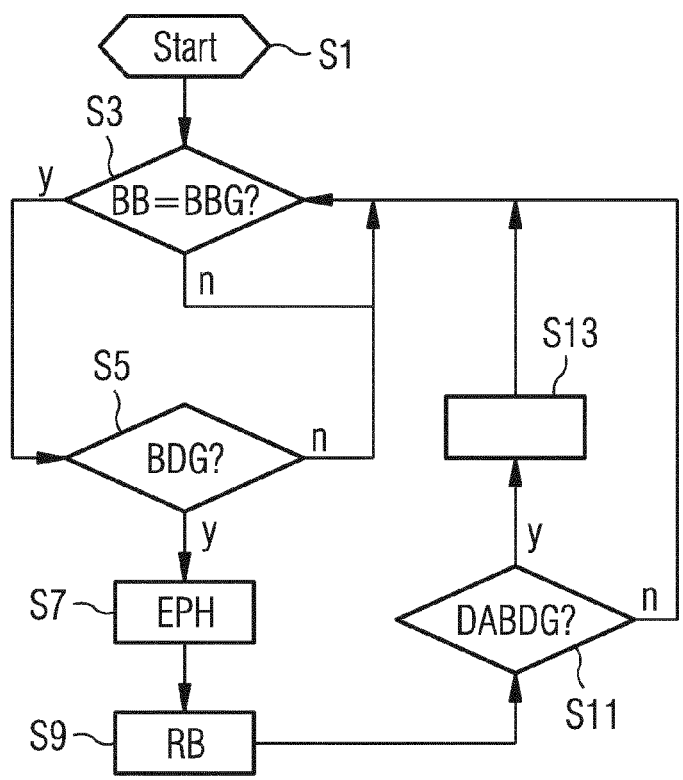
FIG. 4 shows a flowchart of a program for operating the internal combustion engine.

A program which is stored in the control device 6 is run during the operation in the computing unit in order to operate the internal combustion engine and is explained in more detail below with reference to the flowchart according to FIG. 4.

The program is started in a step S1, specifically, for example, in close to real time with respect to a start of the internal combustion engine.

In the step S1, if appropriate variables are also initialized.

In a step S3 it is checked whether an operating range BB currently corresponds to a predefined operating range BBG. The predefined operating range BBG is predefined in such a way that it is basically suitable for carrying out cylinder-specific diagnosis on the basis of unsmooth running. This can be determined, for example, by means of trials, that is to say for example on an engine test bench and/or even by simulation. The predefined operating range BBG is, for example, a lower partial load operating mode which can be distinguished by the fact that the rotational speed of the crankshaft 21 is approximately at maximum 2500 revolutions per minute. If the operating range BB does not correspond to the predefined operating range BBG, the processing is continued again in the step S3, if appropriate after a predefined waiting time.

Otherwise, the processing is continued in a step S5. In the step S5 it is checked whether a predefined condition BDG is satisfied. The predefined condition BDG can be satisfied, for example, if a quasi-steady-state operating state is present and/or a predefined time period has expired since a last termination of a cylinder-specific diagnosis which is based on unsmooth running, with respect to emissions of pollutants. This can be related, as explained further below, to the last running of a step S13, for example.

The satisfaction of the predefined condition BDG in the step S5 can alternatively or else additionally depend on a predefined distance since the cylinder-specific diagnosis which is based on unsmooth running was last terminated.

If the predefined condition BDG is not satisfied in the step S5, the processing can be continued again in the step S3, if appropriate after the predefined waiting time period.

Otherwise, the processing is continued in a step S7 and the cylinder-specific diagnosis which is based on unsmooth running is therefore started beginning with the satisfaction of the predefined condition BDG in the step S5. However, this is carried out actively only during the processing of the step S7, specifically during a respective detection phase EPH. The detection phase EPH is initiated by a modified proportional jump of the correction signal KS to the neutral value, as is illustrated in FIG. 3B. It is carried out with a modified integral parameter of the lambda controller which is reduced in absolute value compared to the integral parameter in the normal operating mode RB of the lambda controller.

During the detection phase EPH, the air/fuel mixture which is to be fed to the cylinders is incrementally made more and more lean by means of a lean adjustment signal AS until a predefined unsmooth running value is attained with respect to this cylinder. The lean adjustment signal AS is illustrated for the respective cylinder in FIG. 3A, for example.

In order to ensure overall as far as possible a negligible change in the air/fuel mixture, the air/fuel ratio in the other cylinders is preferably correspondingly influenced in an opposite way with respect to the other cylinder during the detection phase EPH. Corresponding adjustment of the air/fuel mixture in the rich direction therefore occurs in the other cylinders.

Figure 3C:
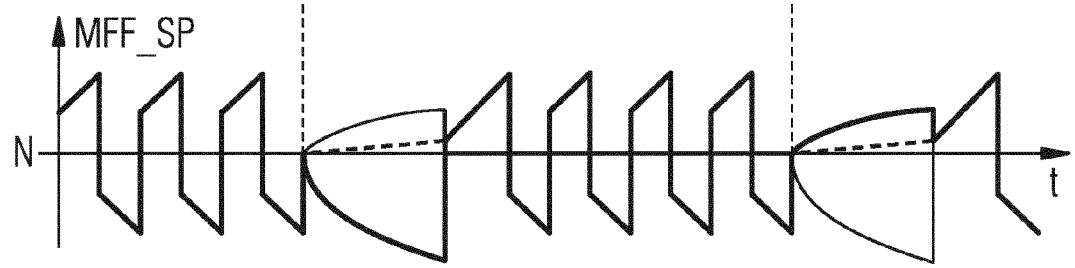

The lean adjustment signal AS is embodied, for example, in the form of a factor with which the fuel mass rate which is to be metered to the respectively currently tested cylinder is correspondingly multiplied and therefore adapted. This is illustrated, for example, on the basis of the signal profile in FIG. 3C.

If the predefined unsmooth running value is attained, the value of the lean adjustment signal AS which is then the current one is stored in accordance with the respective cylinder and used for subsequent determination of a diagnostic value which is related to this respective cylinder. The attainment of the predefined unsmooth running value is detected by means of the measurement signal of the crankshaft angle sensor 22.

The detection phase EPH is ended chronologically correlated with the attainment of the predefined unsmooth running value and the running is subsequently carried out in the step S9 in which the normal operating mode RB of the lambda controller is continued. For example, the normal operating mode RB is continued for at least one controller cycle of the lambda controller, preferably even for a plurality of controller cycles, before at the earliest step S7 is run again.

The modified integral parameter is predefined in such a way that during the detection phase EPH the air/fuel ratio in the cylinder which is to be respectively currently tested changes only to a small degree, influenced by the correction signal KS, and specifically changes in such a way that the influence on a change in the unsmooth running is tolerable, and therefore the value of the lean adjustment signal when the predefined unsmooth running value is attained has a maximum influence within the scope of a desired diagnostic quality. It is therefore possible, for example, for the modified integral parameter to be at maximum 20% of the integral parameter in absolute value for the normal operating mode of the lambda controller. However, it can also be reduced to the neutral value N.

In the case of respective successive passes through the step S7, various cylinders Z1-Z4 are tested by incrementally changing the lean adjustment signal AS in relation to the respective cylinder, with the result that ultimately corresponding values of the lean adjustment signal AS are collected for all the relevant cylinders Z1-Z4 when the unsmooth running value is attained, said values being stored correspondingly in the memory of the control device 6. In this context, in principle a plurality of values can also be stored per cylinder Z1-Z4 in order, therefore, to be able to carry out, for example, averaging of the values of the lean adjustment signal for the respective cylinder Z1-Z4 when the predefined unsmooth running value is attained, and therefore to compensate, for example, possible atypical measurement values.

Subsequent to the step S9 it is checked whether a diagnostic termination condition DABDG is satisfied (step 11). This may be the case, for example, if a predefined number of values of the lean adjustment signal AS is present with respect to all the relevant cylinders Z1-Z4. If the condition of the step S11 is not satisfied, the running of the program is continued again in the step S3, if appropriate after a predefined waiting time. If the condition of the step S11 is, on the other hand, satisfied, the running of the program is continued in the step S13 in which the cylinder-specific diagnosis which is based on unsmooth running is terminated. In this context, in the step S13 a diagnostic value which is related to the respective cylinder is determined as a function of the respective value or values of the lean adjustment signal AS, which is/are stored with respect to a cylinder. For this purpose, for example firstly a mean value of the lean adjustment signal AS which is related to all the relevant cylinders Z1 to Z4 is determined. The diagnostic value can then be determined as a function of a relative or absolute deviation of the value or values of the respective individual cylinder with respect to the mean value of the lean adjustment signal AS.

In the step S13, a respective diagnostic value can be determined for each relevant cylinder correspondingly. Said diagnostic value can be used to decide, for example, whether an incorrect entry in a fault memory of the control device is to be made or else a fault is to be signaled to a vehicle driver. Alternatively or additionally, it is, however, also possible in this way for the fuel mass which is to be metered to be adapted in relation to the respective cylinder Z1 to Z4, for example within the scope of an adaptation process.

What is claimed is:

1. A method for operating an internal combustion engine having a plurality of cylinders, which are each assigned respective injection valves for metering fuel, and an exhaust gas probe which has discrete level probe characteristics and is arranged in an exhaust gas section and whose measurement signal is characteristic of an air/fuel ratio in the respective cylinder, a crankshaft angle sensor whose measurement signal is representative of a crankshaft angle of a crankshaft, the method comprising:
    determining a correction signal for a fuel mass to be metered using a lambda controller, e.g., as a function of the measurement signal of the exhaust gas probe,
    when at least one predefined condition is satisfied within a predefined operating range of the internal combustion engine, performing a cylinder-specific diagnosis with respect to emissions of pollutants on the basis of unsmooth running,
    wherein during the execution of the cylinder-specific diagnosis, the diagnosis actively performed only in a respective detection phase initiated by a modified proportional jump of the correction signal to a neutral value (N), and
    wherein the diagnosis is performed with a modified integral parameter of the lambda controller, which integral parameter is reduced in absolute value compared to an integral parameter in a normal operating mode of the lambda controller.

2. The method of claim 1, wherein the lambda controller is operated in the normal operating mode between two successive detection phases for at least one controller cycle.

3. The method of claim 1, wherein the predefined operating range is a lower partial load operating mode.

4. The method of claim 1, comprising:
    during a respective detection phase, incrementally making the air/fuel mixture to be fed to one of the cylinders leaner using a lean adjustment signal until a predefined unsmooth running value is attained with respect to the cylinder, and
    determining a diagnostic value relating to the respective cylinder as a function of the lean adjustment signal.

5. The method of claim 4, wherein the respective detection phase is ended chronologically correlated with the attainment of the predefined unsmooth running value and the normal operating mode of the lambda controller is continued.

6. A device for operating an internal combustion engine having a plurality of cylinders, which are each assigned respective injection valves for metering fuel, and an exhaust gas probe which has discrete level probe characteristics and is arranged in an exhaust gas section and which generates a measurement signal characteristic of an air/fuel ratio in the respective cylinder, and a crankshaft angle sensor that generates a measurement signal representative of a crankshaft angle of a crankshaft,
    wherein the device is configured to:
    determine a correction signal for a fuel mass to be metered using a lambda controller, as a function of the measurement signal of the exhaust gas probe,
    when at least one predefined condition is satisfied within a predefined operating range of the internal combustion engine, perform a cyljnder-specific diagnosis with respect. to emissions of pollutants on the basis of unsmooth running,
    wherein during the execution of the cylinder-specific diagnosis, the diagnosis actively performed only in a respective detection phase initiated by a modified proportional jump of the correction signal to a neutral value, and
    wherein the diagnosis is performed with a modified integral parameter of the lambda controller, which integral parameter is reduced in absolute value compared to an integral parameter in a normal operation mode of the lambda controller.

* * * * *